United States Patent [19]

Speckbrock et al.

[11] Patent Number: 5,800,060
[45] Date of Patent: Sep. 1, 1998

[54] CLINICAL THERMOMETER

[75] Inventors: Gerd Speckbrock, Ilmenau; Siegbert Kamitz, Elgersburg; Marion Alt, Frankenhain; Heribert Schmitt, Geschwenda, all of Germany

[73] Assignee: Geraberger Thermometer Werk GmbH, Germany

[21] Appl. No.: 387,921

[22] PCT Filed: Aug. 16, 1993

[86] PCT No.: PCT/DE93/00736

§ 371 Date: Feb. 21, 1995

§ 102(e) Date: Feb. 21, 1995

[87] PCT Pub. No.: WO94/04895

PCT Pub. Date: Mar. 3, 1994

[30] Foreign Application Priority Data

Aug. 19, 1992 [DE] Germany ............ 42 27 434.6

[51] Int. Cl.$^6$ ............ G01K 3/04; G01K 5/22; G01K 5/10; G01K 5/12

[52] U.S. Cl. ............ 374/104; 374/201; 252/408.1; 252/962; 128/736

[58] Field of Search ............ 374/201, 104, 374/106; 252/408.1, 962; 420/555; 128/736

[56] References Cited

U.S. PATENT DOCUMENTS

| | | | |
|---|---|---|---|
| 3,150,901 | 9/1964 | Esten et al. | 420/555 |
| 4,076,637 | 2/1978 | Gerald | 252/26 |
| 4,083,250 | 4/1978 | Goff et al. | 374/201 |
| 4,627,741 | 12/1986 | Faller | 374/104 |
| 4,647,224 | 3/1987 | Holm et al. | 374/106 |
| 4,659,384 | 4/1987 | Daigo et al. | 420/555 |
| 5,120,498 | 6/1992 | Cocks | 420/555 |
| 5,198,189 | 3/1993 | Booth et al. | 420/555 |

FOREIGN PATENT DOCUMENTS

| | | | |
|---|---|---|---|
| 2 586 805 | 6/1987 | France. | |
| 1 144 506 | 2/1963 | Germany. | |
| 3304022 A1 | 6/1985 | Germany. | |
| 0101208 | 8/1975 | Japan | 420/555 |
| 0012253 | 3/1982 | Japan. | |
| 0116357 | 7/1984 | Japan | 420/555 |
| 0123736 | 7/1984 | Japan | 420/555 |
| 0135548 | 7/1985 | Japan | 420/555 |
| 246843 | 6/1926 | United Kingdom. | |

OTHER PUBLICATIONS

Author: E. Greil Wertheim, Title: *Glass Thermometers: vacuum or pressure filled?*, Date: Sep. 1972. Pertinent pp.: 1033–1040, see p. 1035 par. 5–p. 1036, par. 1, Published in: Git–Fachzeitschrift Fur Das Laboratorium vol. 16 No. 9, Sep. 1972.

"Expanding Fluid Thermometer Having Thermally Sensitive Bulb," J.M. Brady, published O.G. Sep. 29, 1953 (No. 245622).

*Primary Examiner*—Diego F.F. Gutierrez
*Attorney, Agent, or Firm*—Brooks & Kushman P.C.

[57] ABSTRACT

A clinical thermometer registers the maximum temperature reached and uses as the thermometric fluid a non-toxic gallium/indium alloy which adheres to the walls of the thermometer measuring tube, the adhesive force being greater than the internal cohesive force of the thermometric liquid. A Gallium/indium/tin eutectic alloy is particularly useful in such applications and others.

7 Claims, 1 Drawing Sheet

CLINICAL THERMOMETER

BACKGROUND OF THE INVENTION

1. Field of the Invention

The present invention relates to a clinical thermometer with a maximum function and a eutectic mixture suited to it.

2. Description of the Related Art

In order to achieve the maximum function, conventional thermometers of this kind are filled with mercury and show a constriction between the bulb exposed to the temperature to be measured and the reading or measuring tube, which has the effect that in the cooling down process the mercury thread that entered the measuring tube separates.

Mercury is extremely poisonous and for health and environmental reasons is therefore increasingly met with disapproval.

Furthermore, in making the thermometer, an additional production step is necessary in order to create the constriction which requires a certain amount of precision so that the necessary inner cross-section is achieved which has to be small to facilitate the separation of the mercury thread upon a drop in temperature after having reached the maximum temperature, but not so small as to interfere with the reuniting of the mercury upon shaking down.

In accordance with US-PS 3,872,729 it was suggested to do without the problematic constriction and to coat the inside of the measuring tube to assure the necessary adhesion forces. The production of such a measuring tube is, however, very expensive and usually not very practical. Furthermore, it is necessary also with this thermometer to rely on toxic mercury.

So far, all attempts to produce a mercury-free clinical thermometer failed first of all because of the necessary maximum function. Similarly unsuitable are also the thermometers according to DE-PS 453 184, DE-PS 454 213 and GB-PS 246 843, which provide for the use of gallium with and without indium. Such thermometers have the disadvantage that their measuring liquid solidifies at low temperatures which may under certain circumstances result in the thermometer shattering.

Similar problems also arise when using a measuring liquid according to SU-PS 279 108.

The object of the present invention is therefore to specify the details of a thermometer with a maximum function which is simple to use, easy to produce and is harmless from the health and environmental standpoint.

SUMMARY OF THE INVENTION

According to the invention the solution to the given problems is found by using a eutectic alloy containing gallium in a concentration of 65–95 wt.-%, indium in a concentration of 5–22 wt.-% and tin in a concentration of 0–11 wt.-%, if necessary.

DESCRIPTION OF THE PREFERRED EMBODIMENTS

Figure 1:
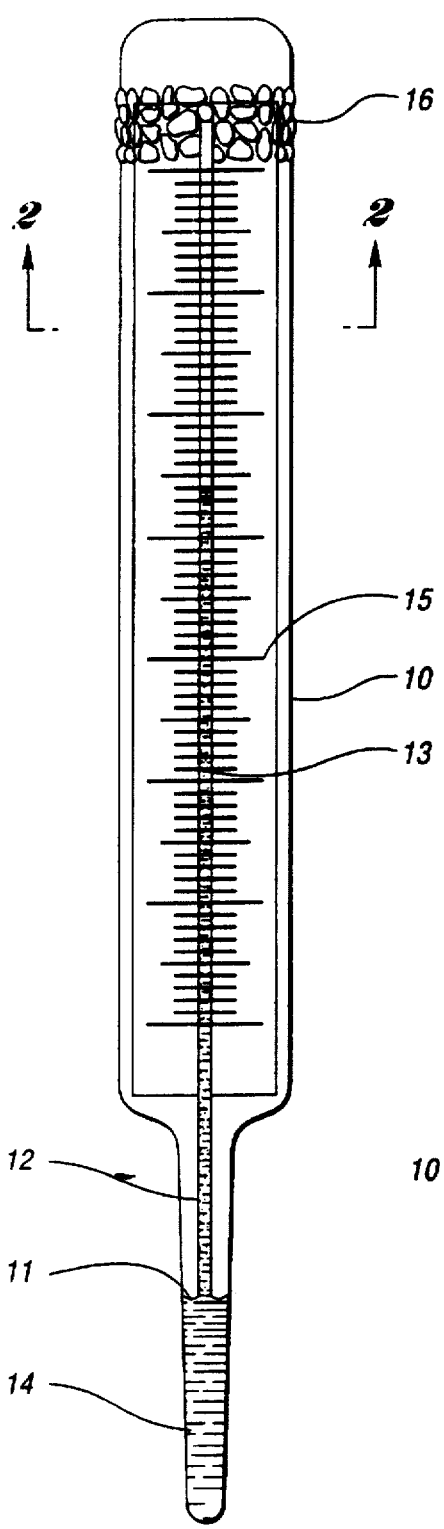
FIG. 1 illustrates one embodiment of a clinical thermometer in accordance with the subject invention.

The use of a eutectic gallium alloy as measuring liquid is of special significance because of its non-toxic characteristic. Furthermore, this liquid has a low melting point and a high vaporization point so that the necessary requirements of a clinical thermometer are met.

In this range of composition the liquid state of aggregation of the liquid extends from approx. −15° C. to more than +1800° C. under normal conditions. Gallium, indium and, if necessary, tin are preferential alloy elements because they lead to a particularly low eutectic point. Furthermore, this alloy is capable of conducting electricity so that it is also suitable for an embodiment as contact thermometer.

In a further embodiment of the present invention according to claim 2 the eutectic alloy may contain up to 2 wt.-% bismuth and up to 2 wt.-% antimony. Antimony raises the oxidation resistance while bismuth positively affects the fluidity of the alloy. Furthermore, antimony and bismuth are, like tin, readily available and inexpensive substances, while gallium and indium are expensive. A content of more than 2 wt.-% pf one of the two additional elements Sb and Bi leads to a noticeable and undesirable increase in the melting point.

In order to keep the liquid used for measuring and reading in the position of maximum wetting of the measuring tube, the adhesion forces inside the measuring tube must be greater than the cohesion forces active in the liquid. This is achieved, among others, by a water coat around the surface area of the measuring tube in contact with the liquid. Preferably this water coat is smaller than the permanent water coat which is normally on the surface of the measuring tube, so that a thin gallium oxide layer is formed by reaction of gallium in the liquid with the water, which deposits on the surface of the measuring tube, increasing the adhesion forces inside the measuring tube. In this respect, one can do without the conventional constriction which simplifies not only the production but also the handling of the thermometer when deliberately returning the measuring thread.

One of the possible embodiments of the thermometer according to the invention has the measuring tube made of glass. It may show a non-circular preferably flat-oval to crescent-shaped cross-section. These characteristics serve to increase the adhesion forces between the measuring liquid and the measuring tube and therefore to guarantee when temperature decreases that the liquid thread is kept in place in the measuring tube which is necessary in order to achieve the desired maximum function.

In a preferred embodiment, the actual measuring tube is connected to the bulb by an area which has an opening with a preferably circular cross-section in order to reduce the adhesion forces there. This results in a high operational reliability of the maximum function.

Thermometers with a measuring tube having a flat or crescent-shaped cross-section are known. This cross-sectional form has, however, so far been applied in the widening and improved readability of the mercury thread and not in increasing the adhesion.

In further embodiments, the outer wall of the clinical thermometer, e.g. the glass housing enclosing the tube, may be provided with a grip element which is formed by several glass mass areas melted onto the housing to improve the grip of the thermometer. Preferably said melted-on glass mass areas are arranged in the form of one or more circumferential rings around the housing. When using colored glass mass or glass paint a marking function, e.g. of the measuring range, or a reference that the clinical thermometer is filled with a non-toxic liquid can also be obtained.

Surprisingly it was found that a preferred eutectic mixture which contains 68–69 wt.-% gallium, 21–22 wt.-% indium and 9.5–10.5 wt.-% tin may be used for various other applications due to its special characteristics. Such a eutectic mixture is e.g. suitable as a lubricant especially for vacuum, high-vacuum and ultra-high vacuum applications.

The eutectic mixture according to the invention should, if possible, only have a small degree of impurity such as lead or zinc of less than 0.001 wt.-%, preferably less than 0.0001 wt.-%.

Said new eutectic mixture is mainly characterized by its low melting point of approx. −19.5° C. under normal pressure and atmospheric conditions. Furthermore, the vaporization point is above 1800° C.

According to the drawing, glass housing 10 encloses a bulb 11 with a measuring tube 13 arranged above the transition area 12. Bulb 11 is filled with said eutectic gallium alloy 14, which, as shown in FIG. 1, has risen inside measuring tube 13 to a certain height as a function of the temperature increase. The measuring tube area of the housing is provided with a scale 15.

Figure 2:
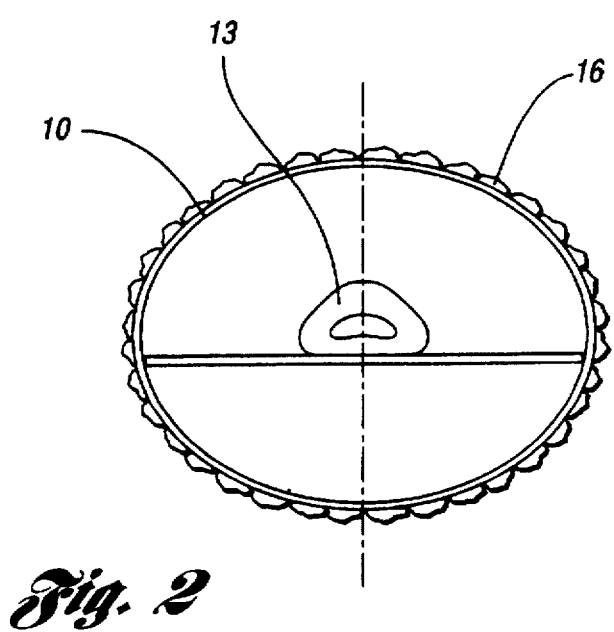
FIG. 2 illustrates a cross-sectional view of the embodiment of the clinical thermometer of FIG. 1 taken across the region 16 of FIG. 1.

Measuring tube 13 has, as shown in FIG. 2, a oval to nearly crescent-shaped cross-section to increase the adhesion between liquid 14 and measuring tube 13. Transition area 12 has an opening with a preferably circular cross-section to reduce the adhesion forces in this area ensuring the desired maximum function.

In the vicinity of the end opposing bulb 11 ten small irregular glass mass areas 16 are melted onto the outside of housing 10 forming one or more circumferential ring(s) around housing 10. Theses ring(s) does not only improve grip in this area of housing 10 but may also be used for colour coding.

We claim:

1. A clinical thermometer which registers the maximum temperature reached with a bulb and a measuring tube containing a liquid, characterized in that the liquid is a eutectic alloy containing gallium in a concentration of 65–95 wt.-%, indium in a concentration of 5–22 wt.-% and tin in a concentration of 0–11 wt.-%, the inside liquid-contacting surface of said measuring tube having disposed thereon a gallium oxide coating produced by reaction of said liquid with water contained in a water coat on said inside surface of said measuring tube.

2. Clinical thermometer according to claim 1, characterized in that the alloy contains up 2 wt.-% bismuth and up to 2 wt.-% antimony.

3. A clinical thermometer according to claim 2, characterized in that the measuring tube has a non-circular cross-section and is connected to a bulb via an area with a circular cross-section.

4. A clinical thermometer according to claim 1, characterized in that the measuring tube has a non-circular cross-section and is connected to a bulb via an area with a circular cross-section.

5. A clinical thermometer according to claim 4, characterized in that the measuring tube is enclosed in a glass housing provided with a grip element which is formed by several glass mass areas melted onto the glass housing.

6. A clinical thermometer according to claim 1, characterized in that the measuring tube is enclosed in a glass housing provided with a grip element which is formed by several glass mass areas melted onto the glass housing.

7. Clinical thermometer according to claim 6, characterized in that the melted-on glass mass areas (16) are arranged in the form of at least one ring around housing (10).

* * * * *